United States Patent
Shimizu et al.

[11] Patent Number: 6,135,345
[45] Date of Patent: Oct. 24, 2000

[54] METAL MATERIAL BONDING METHOD

[75] Inventors: Takao Shimizu; Noboru Yamamoto; Shigeyuki Inagaki; Hiroaki Suzuki, all of Nagoya, Japan

[73] Assignee: Daido Tokushuko Kabushiki Kaisha, Japan

[21] Appl. No.: 09/246,709

[22] Filed: Feb. 9, 1999

[30]     Foreign Application Priority Data

Feb. 10, 1998  [JP]  Japan .................................. 10-044452

[51] Int. Cl.$^7$ .................................................. B23K 35/12
[52] U.S. Cl. ........................... 228/245; 228/246; 228/249
[58] Field of Search .................................... 228/245, 246, 228/249, 262.1, 262.3, 262.4

[56]              References Cited

U.S. PATENT DOCUMENTS

| | | | |
|---|---|---|---|
| 3,668,359 | 6/1972 | Emmerson | 219/60 A |
| 4,153,194 | 5/1979 | Leonard, Jr. | 228/29 |
| 5,316,202 | 5/1994 | Murray et al. | 228/5.5 |
| 5,660,317 | 8/1997 | Singer et al. | 228/44.3 |
| 5,699,995 | 12/1997 | Shimizu et al. | 228/194 |
| 5,831,252 | 11/1998 | Shimizu | 219/603 |

FOREIGN PATENT DOCUMENTS

| | | |
|---|---|---|
| 0 278 030 | 8/1988 | European Pat. Off. . |
| 63-140781 | 6/1988 | Japan . |
| 402015196 | 1/1990 | Japan ..................... 228/1.1 |
| 363120608 | 8/1994 | Japan ..................... 228/1.1 |
| 406226468 | 8/1994 | Japan ..................... 228/3.1 |
| 07120996 | 11/1996 | Japan . |

*Primary Examiner*—Gregory Mills
*Assistant Examiner*—Zidia T. Pittman
*Attorney, Agent, or Firm*—Bacon & Thomas PLLC

[57]              ABSTRACT

In a metal material bonding method, an insertion material, which has a lower melting point than that of metal materials to be bonded, is interposed between bonding end surfaces of the metal materials to be bonded. The metal materials to be bonded is heated and held to a temperature not lower than the melting point of the insertion material and not higher than the melting point of the metal materials to be bonded while applying pressure to bonding surfaces of the metal materials to be bonded. The insertion material is formed to have a size which is smaller than each of the bonding surfaces of the metal materials to be bonded.

13 Claims, 3 Drawing Sheets

METAL MATERIAL BONDING METHOD

BACKGROUND OF THE INVENTION

1. Field of the Invention

The present invention relates to a metal material bonding method. More specifically, it relates to improvement in a metal material bonding method in which an insertion material is interposed between the metal materials to be bonded.

2. Description of the Related Art

Heretofore, a bonding method using an insertion material interposed between materials to be bonded to each other has been employed in liquid-phase diffusion bonding.

However, because the insertion material used is formed to have a shape and a size so as to cover the whole of bonding surfaces, there arises a problem that the insertion material is partially extruded between materials to be bonded at the time of bonding so that surfaces of the bonding portions of the materials to be bonded are covered with the insertion material. When the bonding portions are under such a condition, the insertion material extruded and solidified so as to cover the surfaces of the bonding portions of the materials to be bonded exerts a notching effect so that strength against fatigue of bonding is lowered. Therefore, the work of removing the insertion material covering the surfaces of the bonding portions of the materials to be bonded after bonding is required. There arises also a problem that this brings about lowering of productivity or workability.

SUMMARY OF THE INVENTION

It is an object of the present invention to provide a metal material bonding method in which an insertion material interposed between bonding surfaces of the materials to be bonded is prevented from excessively covering bonding end portions of the materials to be bonded at the time of bonding.

According to the present invention, the metal material bonding method comprises the steps of: interposing an insertion material, which has a lower melting point than that of metal materials to be bonded, between bonding end surfaces of the metal materials to be bonded; and heating and holding the metal materials to be bonded to a temperature not lower than the melting point of the insertion material and not higher than the melting point of the metal materials to be bonded while applying pressure to bonding surfaces of the metal materials to be bonded, wherein the insertion material is formed to have a size which is smaller than each of the bonding surfaces of the metal materials to be bonded.

According to a first embodiment of the metal material bonding method of the present invention, each of the metal materials to be bonded is provided as a solid material; the insertion material is formed of an Ni-group or Fe-group alloy containing boron in a range of from 2.0 mass % to 5.0 mass % (preferably, 3.0 mass % to 4.0 mass %) and has a thickness in a range of from 20 $\mu$m to 100 $\mu$m (preferably, 30 $\mu$m to 50 $\mu$m); the ratio of the area of the insertion material to the area of each of the bonding surfaces of the metal materials to be bonded is in a range of from 50% to 99% (70% to 85%); and the distance between the outer edge of the insertion material and the outer edge of each of the metal materials to be bonded is not smaller than a value ten times (preferably, fifteen times) as large as the thickness of the insertion material.

According to a second embodiment of the metal material bonding method of the present invention, each of the metal materials to be bonded is provided as a hollow material; the insertion material is formed of an Ni-group or Fe-group alloy containing boron in a range of from 2.0 mass % to 5.0 mass % (preferably, 3.0 mass % to 4.0 mass %) and has a thickness in a range of from 20 $\mu$m to 100 $\mu$m (preferably, 30 $\mu$m to 50 $\mu$m); the ratio of the area of the insertion material to the area of each of the bonding surfaces of the metal materials to be bonded is in a range of from 50% to 99% (70% to 85%); the distance between the outer edge of the insertion material and the outer edge of each of the metal materials to be bonded is not smaller than a value ten times as large as the thickness of the insertion material; and the distance between the inner edge of the insertion material and the inner edge of each of the metal materials to be bonded is not larger than a value one hundred times as large as the thickness of the insertion material (preferably, the inner edge of each of the metal materials to be bonded is not smaller than a value ten times as large as the thickness of the insertion material).

In the metal material bonding method of the present invention, it is preferable that the surface roughness $R_{max}$ of each of the bonding surfaces of the metal materials to be bonded is not larger than 50 $\mu$m; the pressure applied to the bonding surfaces of the metal materials to be bonded is in a range of from 3 MPa to 9 MPa; and the heating and holding is performed in a non-oxidative atmosphere.

In the metal material bonding method of the present invention, it is preferable that the heating is performed by means of induction heating or high frequency resitance heating.

In this case, it is preferable that the frequency of a current in the induction heating or resistance heating is in a range of from 3 kHz to 100 kHz (preferably, 3 kHz to 30 kHz).

In the metal material bonding method according to the present invention, the size of the insertion material is adjusted so that the insertion material is set inward by a predetermined quantity from the outer edge of each of the bonding surfaces of the metal materials to which the insertion material is bonded. Accordingly, a part of the insertion material is prevented from being excessively extruded to the bonding end portions at the time of bonding. Accordingly, the strength against the fatigue of the bonding portions is prevented from being lowered by the insertion material which is extruded to the surfaces of the bonding portions and solidified thereat.

PREFERRED EMBODIMENTS OF THE INVENTION

Preferred embodiments of the present invention will be described below with reference to the accompanying drawings but the present invention is not limited to those embodiments.

Embodiment 1

Figure 1:
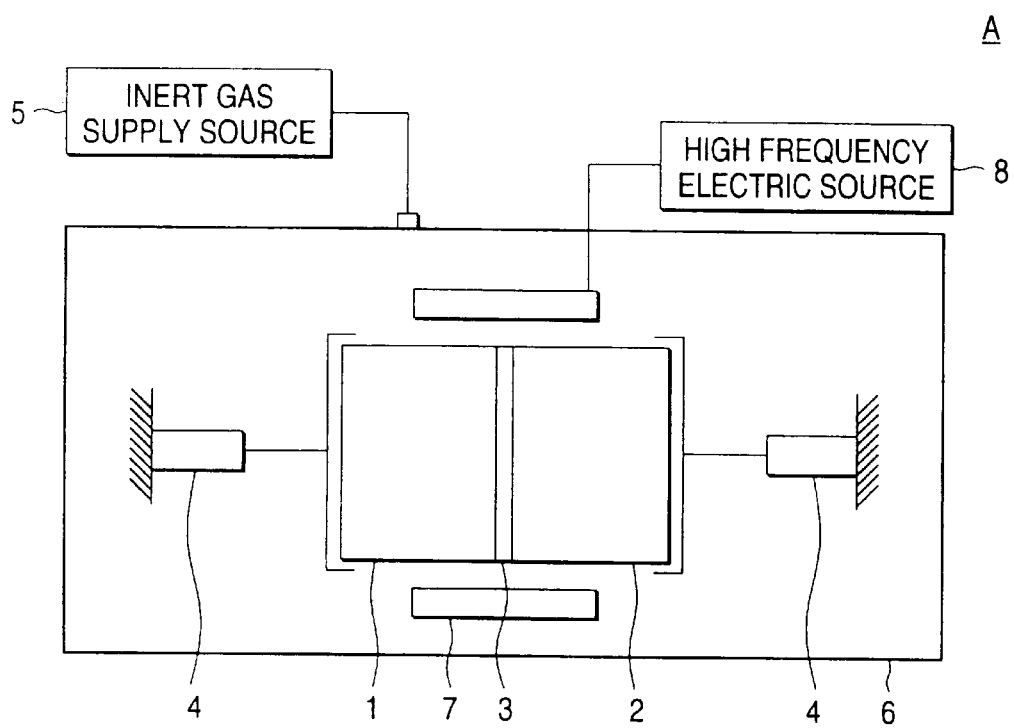
FIG. 1 is a schematic view of a bonding apparatus used in Embodiment 1 of the present invention.

FIG. 1 is a schematic view showing a main part of a bonding apparatus used in Embodiment 1 of the metal material bonding method according to the present invention. In this bonding apparatus A, metal round rods (hereinafter merely called "round rods") are used as metal materials 1 and 2 to be bonded to each other. An insertion material 3 is interposed between bonding surfaces of the round rods 1 and 2. An inert gas, such as an Ar gas, an $N_2$ gas, a mixture gas of Ar and $N_2$, or the like, is supplied from an inert gas supply source 5 into a housing 6 which receives the round rods 1 and 2 to be bonded to each other, so that the inside of the housing 6 is set in an atmosphere of inert gas. While bonding portions of the round rods 1 and 2 are pressed by a pressing device 4 and while bonding end portions of the round rods 1 and 2 are heated by an induction heating device 7 in the atmosphere of inert gas, the round rods 1 and 2 are diffusion-bonded to each other. If bonding is performed in an oxidative atmosphere, oxygen grasped between the end surfaces of the metal materials reacts with the insertion material to form oxide. If the oxide remains in the bonding surfaces, mechanical characteristic of the bonding is lowered. Accordingly, bonding is preferably performed in a non-oxidative atmosphere such as an inert gas atmosphere, or the like. Incidentally, in FIG. 1, the reference numeral 8 designates a high-frequency electric source device for the induction heating device. Further, in FIG. 1, the thickness of the insertion material 3 is exaggerated for convenience of description.

The insertion material 3 is provided as a disk formed of an Ni-group or Fe-group alloy containing boron in a range of from 2.0 mass % to 5.0 mass %. The thickness of the insertion material 3 is in a range of from 20 μm to 100 μm. Boron not only has an effect of decreasing the melting point of the Ni-group alloy but also has a high diffusion speed so as to be diffused from the dissolved insertion material 3 into a solid base material easily. An "isothermal solidification phenomenon" is generated in such a manner that the boron content of the dissolved insertion material 3 is reduced because of the diffusion of boron from the dissolved insertion material 3 into the solid base material, so that the melting point of the dissolved insertion material 3 rises. As a result of the "isothermal solidification phenomenon", the materials to be bonded to each other are fused firmly. However, if the boron content in the insertion material 3 is smaller than 2 mass %, the effect is insufficient. If the boron content is contrariwise larger than 5 mass %, the melting point of the insertion material 3 rises to simply increase the time required for diffusing boron from the dissolved insertion material 3 into the solid base material. Accordingly, in this Embodiment 1, the upper limit is set to 5 mass %. In this case, the boron content in the insertion material 3 is more preferably in a range of from 3 mass % to 4 mass %.

Figure 2:
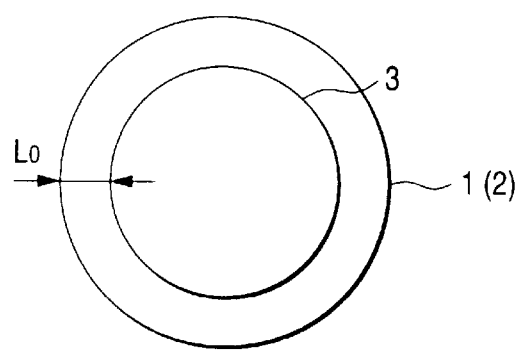
FIG. 2 is a view showing a state in which an insertion material used in this Embodiment 1 is attached to bonding surfaces of the metal materials to be bonded to each other.

If the thickness of the insertion material 3 is less than 20 μm, not only it is impossible to obtain an insertion material 3 dissolved enough to make the roughness of the bonding surfaces even but also the concentration distribution of various components in the insertion material 3 becomes uneven so that it is impossible to produce any foil-like sheet in an extreme case. If the thickness of the insertion material 3 is more than 100 μm, the melted insertion material 3 is excessively extruded to the surfaces of the bonding portions by lo the "pressing force" applied to the bonding surfaces so that not only the quality of external appearance is spoiled but also the protruded portions of the insertion material 3 extruded to the surfaces of the bonding portions and solidified thereat become concentrated stress sources to deteriorate the mechanical properties of the bonding in the case where the bonding portions are used without being mechanically processed. Furthermore, the time required for diffusing boron from the melted insertion material 3 into the solid base material increases. Accordingly, the upper limit is set to 100 μm. In this Embodiment 1, the diameter of the insertion material 3 is slightly smaller than that of each of the round rods, as shown in FIG. 2. Specifically, the distance $L_0$ from the outer edge of the insertion material 3 to the outer edge of each of the round rods 1 and 2 is not smaller than a value ten times as large as the thickness of the insertion material 3. The ratio of the area of the insertion material 3 to the area of each of the bonding surfaces of the round rods 1 and 2 is in a range of from 50% to 99%. Here, the insertion material 3 formed of an Fe-group alloy is preferably used in the case of bonding the round rods 1 and 2 of carbon steel whereas the insertion material 3 formed of an Ni-group alloy is preferably used in the case of bonding the round rods 1 and 2 of stainless steel. Incidentally, the insertion material 3 is not necessary to be always shaped like a disk if the aforementioned condition is satisfied. For example, the insertion material 3 may be shaped like a ring. Further, in FIG. 2, the distance Lo between the outer edge of the insertion material 3 and the outer edge of the carbon steel round rod 1 (2) is exaggerated for convenience of description.

In a state in which the insertion material 3 is interposed between the bonding surfaces of the round rods 1 and 2 to be bonded to each other, the bonding surfaces are pressed by the pressing device 4. Here, the pressure applied to the round rods 1 and 2 is in a range of from 3 MPa to 9 MPa. If the pressure applied between the end surfaces of the metal materials, that is, the pressure applied between the round rods 1 and 2 is lower than 3 MPa, the dissolved insertion material 3 cannot make the roughness of the bonding surfaces even so that the mechanical properties of the bonding deteriorate. On the contrary, if the pressure applied between the end surfaces of the metal materials, that is, the pressure applied between the round rods 1 and 2 is higher than 9 MPa, the bonding portions are deformed excessively so that not only the quality of the external appearance is spoiled but also the mechanical properties of the bonding is lowered. Accordingly, the upper limit is set to 9 MPa. Further, to obtain uniform bonding, the surface roughness $R_{max}$ of each of the end surfaces of the round rods 1 and 2 to be bonded to each other is not larger than 50 μm. If the surface roughness $R_{max}$ of each of the bonding surfaces is larger than 50 μm, the dissolved insertion material 3 cannot make the roughness of the bonding surfaces even so that the mechanical properties of the bonding deteriorate. Accordingly, the upper limit of $R_{max}$ is set to 50 μm.

Though not shown clearly, the induction heating device 7 has a heating portion constituted by a ring coil. The frequency of a current flowing in the ring coil should not be higher than 100 kHz. In either a high-frequency induction heating method or a high-frequency resistance heating method, only the surfaces are heated locally by the "skin effect" as the frequency becomes high. Accordingly, if the temperature outside the bonding surfaces reaches a predetermined value, the temperature of the center portion (solid material) or the inside (pipe material) of the bonding surfaces becomes excessively lower than the outside temperature, and sufficient bonding strength cannot be obtained. Accordingly, the upper limit of the frequency is set to 100 kHz. More preferably, the frequency is in a range of from 3 kHz to 30 kHz. Incidentally, the heating portion of the induction heating device 7 and the housing 6 covering the heating portion are designed so as to be able to be halved.

This is preferable from the point of view of facilitating the setting and separation of the round rods 1 and 2.

As described above, in this Embodiment 1, the disk-like or ring-like insertion material 3 having a diameter slightly smaller than that of the round rods 1 and 2 is used to perform diffusion bonding. Accordingly, after bonding, the insertion material 3 is never excessively extruded to the surfaces of the bonding portions. Accordingly, no finishing is required on the bonding end portions after diffusion bonding. Accordingly, the productivity and workability in diffusion bonding are improved greatly.

Embodiment 2

In Embodiment 2 of the metal material bonding method according to the present invention, metal round pipes (hereinafter merely called "round pipes") 1 and 2 are used as the materials 1 and 2 to be bonded to each other. An insertion material 3 is used so that the round pipes 1 and 2 are bonded to each other by a bonding apparatus A shown in FIG. 1.

Figure 3:
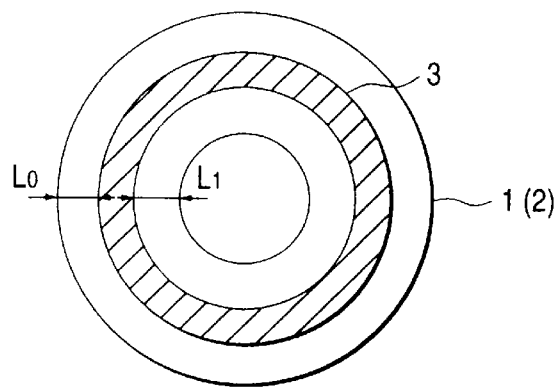
FIG. 3 is a view showing a state in which an insertion material used in Embodiment 2 of the present invention is attached to bonding surfaces of the metal materials to be bonded to each other.

The insertion material 3 is provided as a ring of an Ni-group or Fe-group alloy containing boron in a range of from 2.0 mass % to 5.0 mass %. The thickness of the insertion material 3 is in a range of from 20 $\mu$m to 100 $\mu$m. In this Embodiment 2, the outer diameter of the insertion material 3 is slightly smaller than that of each of the round pipes 1 and 2, as shown in FIG. 3. Incidentally, the insertion material 3 is hatched for convenience of description. Specifically, the distance $L_0$ from the outer edge of the insertion material 3 to the outer edge of each of the round pipes 1 and 2 is not smaller than a value ten times as large as the thickness of the insertion material 3 whereas the distance $L_1$ from the inner edge of the insertion material 3 to the inner edge of each of the round pipes 1 and 2 is not larger than a value one hundred times as large as the thickness of the insertion material 3. Further, the ratio of the area of the insertion material 3 to the area of each of the bonding surfaces of the round pipes 1 and 2 is in a range of from 50% to 99%.

Incidentally, with respect to other structures and operation/effect, the Embodiment 2 is designed to be the same as the Embodiment 1. Further, in FIG. 3, the distance $L_0$ between the outer edge of the insertion material 3 and the outer edge of the carbon steel round pipe 1 and the distance $L_1$ between the inner edge of the insertion material 3 and the inner edge of the carbon steel round pipe 1 are exaggerated for convenience of description.

Embodiment 3

Figure 4:
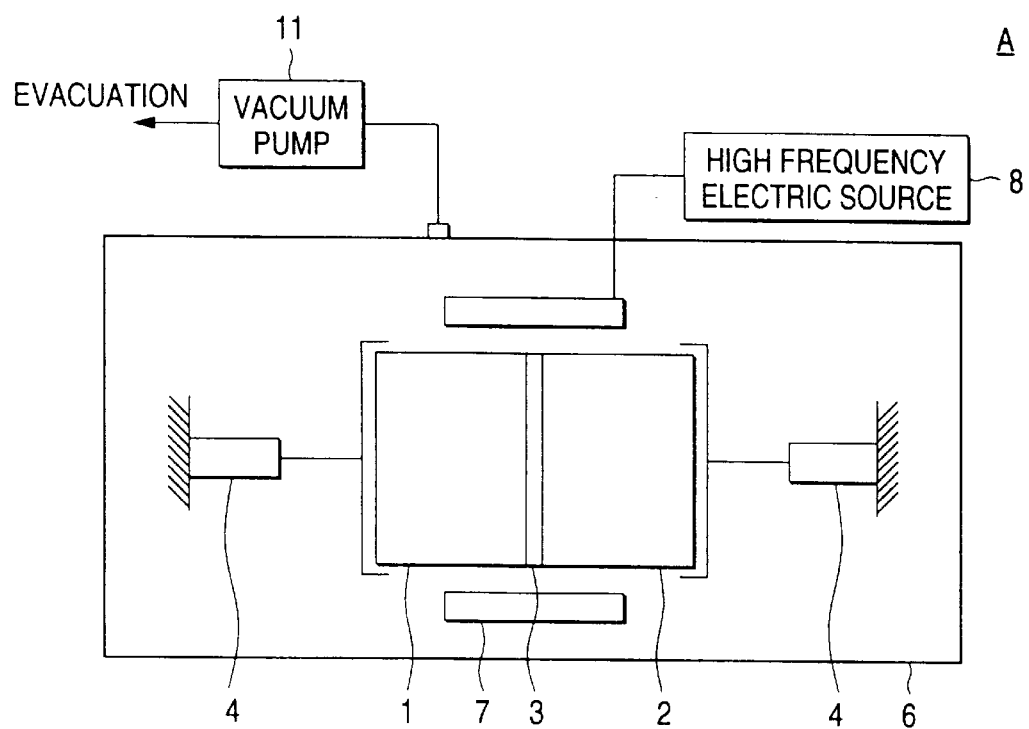
FIG. 4 is a schematic view of a bonding apparatus used in Embodiment 3 of the present invention.

FIG. 4 is a schematic view showing a main part of a bonding apparatus used in Embodiment 3 of the metal material bonding method according to the present invention. In this bonding apparatus A, an insertion material 3 is interposed between bonding surfaces of round rods 1 and 2. Air in a housing 6 which receives the round rods 1 and 2 to be bonded to each other is discharged by a vacuum pump 11 so that the inside of the housing 6 is evacuated to a near vacuum in which the pressure of the inside of the housing 6 is not higher than $5 \times 10^{-2}$ mmHg. While the bonding portions are pressed by a pressing device 4 and while the bonding end portions are heated in the near vacuum by an induction heating device 7, the round rods 1 and 2 are diffused-bonded to each other. Incidentally, in FIG. 4, the constituent parts corresponding to those in FIG. 1 are referenced correspondingly.

With respect to the size, quality, etc., the insertion material 3 in this Embodiment 3 is made the same as the insertion material 3 in the Embodiment 1. Further, also the surface roughness of each of the bonding surfaces of the round rods 1 and 2 which is pressed by the pressing device 4 in a state in which the insertion material 3 is interposed between the bonding surfaces of the round rods 1 and 2, and the pressure and the frequency of a current for pressing the round rods 1 and 2 are made to be the same as those in the Embodiment 1, that is, the surface roughness is not larger than $R_{max}=50$ $\mu$m; the pressure, in a range of from 3 MPa to 9 MPa; and the frequency of a current, not higher than 100 kHz. Incidentally, the insertion material 3 may be shaped like a ring in the same manner as in the Embodiment 1.

As described above, in this Embodiment 3, the disk-like or ring-like insertion material 3 having a diameter slightly smaller than that of the round rods is used to perform diffusion bonding. Accordingly, similarly to the Embodiment 1, the insertion material 3 is never excessively extruded to the surfaces of the bonding portions after bonding. Accordingly, no finishing is required on the bonding end portions after diffusion bonding. Accordingly, the productivity and workability in diffusion bonding are improved greatly.

Embodiment 4

In Embodiment 4 of the metal material bonding method according to the present invention, round pipes 1 and 2 are bonded to each other by a bonding apparatus A shown in FIG. 4 with use of an insertion material 3.

The size and shape of the insertion material 3 in this Embodiment 4 are made to be the same as those of the insertion material 3 in the Embodiment 2.

Incidentally, with respect to other structures and operation/effect, the Embodiment 4 is made the same as the Embodiment 3.

Embodiment 5

Figure 5:
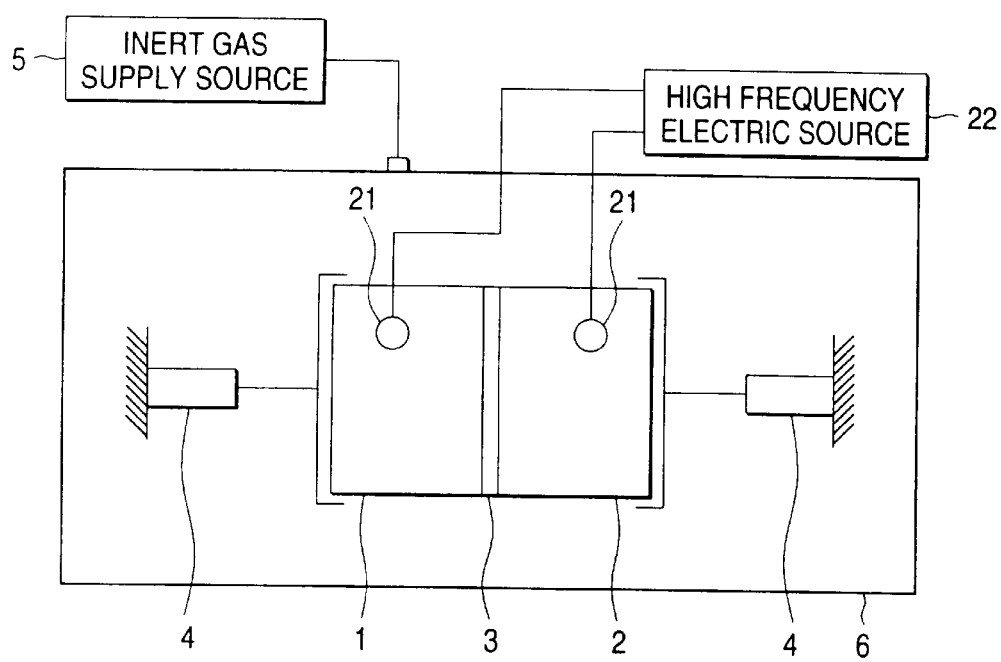
FIG. 5 is a schematic view of a bonding apparatus used in Embodiment 5 of the present invention.

FIG. 5 is a schematic view showing a main part of a bonding apparatus used in Embodiment 5 of the metal material bonding method according to the present invention. In this bonding apparatus A, an insertion material 3 is interposed between bonding surfaces of round rods 1 and 2. An inert gas, such as an Ar gas, an $N_2$ gas, a mixture gas of Ar and $N_2$, or the like, is supplied from an inert gas supply source 5 into a housing 6 which receives the round rods 1 and 2 to be bonded to each other, so that the inside of the housing 6 is set in an atmosphere of inert gas. While bonding portions of the round rods 1 and 2 are pressed by means of a pressing device 4, and while bonding end portions of the round rods 1 and 2 are heated in the atmosphere of inert gas by high frequency resistance heating, the round rods 1 and 2 are diffused-bonded to each other. In the drawing, the reference numeral 21 designates electrodes for high frequency resistance heating; and 22, a high-frequency electric source device. Incidentally, in FIG. 5, constituent parts corresponding to those in FIG. 1 are referenced correspondingly.

With respect to the size, quality, etc., the insertion material 3 in this Embodiment 5 is made the same as the insertion material 3 in the Embodiment 1. Further, also the surface roughness of each of the bonding surfaces of the round rods 1 and 2 which is pressed by the pressing device 4 in a state in which the insertion material 3 is interposed between the bonding surfaces of the round rods 1 and 2. The pressure and the frequency of a current for pressing the round rods 1 and 2 are made to be the same as those in the Embodiment 1. That is, the surface roughness is not larger than $R_{max}=50$ $\mu$m; the pressure, in a range of from 3 MPa to 9 MPa; and the frequency of a current, not higher than 100 kHz, preferably in a range of from 3 kHz to 30 kHz. Incidentally, the insertion material 3 may be shaped like a ring in the same manner as in the Embodiment 1.

As described above, in this Embodiment 5, the disk-like or ring-like insertion material 3 having a diameter slightly smaller than that of the round rods 1 and 2 is used to perform diffusion bonding. Accordingly, after bonding, the insertion material 3 is never excessively extruded to the surfaces of the bonding portions. Accordingly, no finishing is required on the bonding end portions after diffusion bonding. Accordingly, the productivity and workability in diffusion bonding are improved greatly.

Embodiment 6

In Embodiment 6 of the metal material bonding method according to the present invention, round pipes 1 and 2 are bonded to each other by a bonding apparatus A shown in FIG. 5 with use of an insertion material 3.

The size and shape of the insertion material 3 in this Embodiment 6 are made to be the same as those of the insertion material 3 in the Embodiment 2.

Incidentally, with respect to other structures and operation/effect, the Embodiment 6 is made the same as the Embodiment 5.

Embodiment 7

Figure 6:
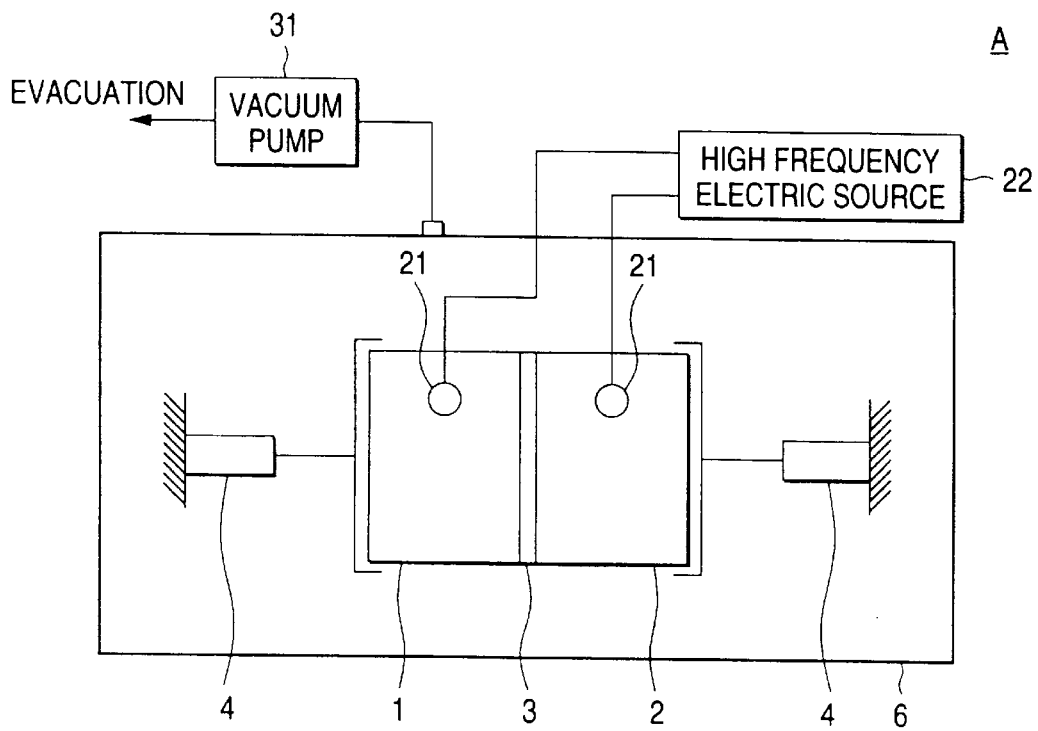
FIG. 6 is a schematic view of a bonding apparatus used in Embodiment 7 of the present invention.

FIG. 6 is a schematic view showing a main part of a bonding apparatus used in Embodiment 7 of the metal material bonding method according to the present invention. In this bonding apparatus A, an insertion material 3 is interposed between bonding surfaces of round rods 1 and 2. Air in a housing 6 which receives the round rods 1 and 2 to be bonded to each other is discharged by a vacuum pump 31 so that the inside of the housing 6 is evacuated to a near vacuum in which the pressure of the inside of the housing 6 is not higher than $5 \times 10^{-2}$ mmHg. While the bonding portions are pressed by a pressing device 4 and while the bonding end portions are heated in the near vacuum by current conduction heating, the round rods 1 and 2 are diffusion-bonded to each other. Incidentally, in FIG. 6, the constituent parts corresponding to those in FIGS. 1 and 5 are referenced correspondingly.

With respect to the size, quality, etc., the insertion material 3 in this Embodiment 7 is made the same as the insertion material 3 in the Embodiment 1. Further, also the surface roughness of each of the bonding surfaces of the round rods 1 and 2 which is pressed by the pressing device 4 in a state in which the insertion material 3 is interposed between the bonding surfaces of the round rods 1 and 2. The pressure and the frequency of a current for pressing the round rods 1 and 2 are made to be the same as those in the Embodiment 1. That is, the surface roughness is not larger than $R_{max}=50 \mu m$; the pressure, in a range of from 3 MPa to 9 MPa; and the frequency of a current, not higher than 100 kHz, preferably in a range of from 3 kHz to 30 kHz. Incidentally, the insertion material 3 may be shaped like a ring in the same manner as in the Embodiment 1.

As described above, in this Embodiment 7, the disk-like or ring-like insertion material 3 having a diameter slightly smaller than that of the round rods 1 and 2 is used to perform diffusion bonding. Accordingly, after bonding, the insertion material 3 is never excessively extruded to the surfaces of the bonding portions. Accordingly, no finishing is required on the bonding end portions after diffusion bonding. Accordingly, the productivity and workability in diffusion bonding are improved greatly.

Embodiment 8

In Embodiment 8 of the metal material bonding method according to the present invention, round pipes 1 and 2 are bonded to each other by a bonding apparatus A shown in FIG. 6 with use of an insertion material 3.

The size and shape of the insertion material 3 in this Embodiment 8 are made to be the same as those of the insertion material 3 in the Embodiment 2.

Incidentally, with respect to other structures and operation/effect, the Embodiment 8 is made the same as the Embodiment 7.

Although the aforementioned Embodiments have shown the case where each of the metal materials to be bonded is shaped like a round rod or a round pipe, the shape of each of the metal materials to be bonded is not limited to such a round shape. But any shape other than such a round rod (pipe) may be used. For example, the metal materials may be shaped like rectangular rods or rectangular pipes. Although the Embodiments have been described above about the case of bonding in a horizontal posture by way of example, the posture is not limited to such a case but any posture, for example, an oblique posture may be used. Further, although the Embodiments have shown a structure in which a pressing force is given to bonding surfaces by pressing respective rear ends of two materials to be bonded to each other, the present invention is not limited to such a structure, but a pressing force may be given while at least one of the two materials to be bonded is being grasped.

EXAMPLES

The present invention will be described below more specifically while comparing various examples of this invention with comparative examples.

After stainless steel round rods and round pipes (SUS304) and carbon steel rectangular pipes (SS400) were bonded under various conditions respectively, a tensile test and a fatigue test were conducted. The conditions and results of the tests at that time are as follows. Here, the melting point of SUS304 is 1480° C. and the melting point of SS400 is 1495° C.

Examples 1 to 4 and Comparative Examples 1 to 3

Stainless steel round rods (SUS304: 50 mm outer diameter) shown in Table 1 were bonded to each other with use of an insertion material shown in Table 1 under a condition shown in Table 2. Then, the bonded stainless steel round rods were subjected to a tensile test and a fatigue test. Results of the test are as shown in Table 3.

It is apparent from the results shown in Table 3 that it is desirable to select the ratio of the area of the insertion material to the area of each bonding surface to be in a range of from 50% to 99%, preferably in a range of from 51% to 98%.

Incidentally, in Table 2, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2 \times 10^6$ and the rate of repetition was 3 Hz.

TABLE 1

| | Classification | Comp. Ex. 1 | Comp. Ex. 2 | Example 1 | Example 2 | Example 3 | Example 4 | Comp. Ex. 3 |
|---|---|---|---|---|---|---|---|---|
| Material to be bonded | Quality | SUS304 | SUS304 | SUS304 | SUS304 | SUS304 | SUS304 | SUS304 |
| | Shape | Round Rod | Round Rod | Round Rod | Round Rod | Round Rod | Round Rod | Round Rod |
| | Outer Diameter (mm) | φ50 | φ50 | φ50 | φ50 | φ50 | φ50 | φ50 |
| | Inner Diameter (mm) | — | — | — | — | — | — | — |
| Insertion Material | Shape Outer Diameter (mm) | φ50 | φ50 | φ49.4 | φ44.0 | φ38.0 | φ40 | φ35 |
| | Shape Inner Diameter (mm) | — | — | — | — | — | φ18 | — |
| | Thickness (μm) | 30 | 30 | 30 | 30 | 30 | 30 | 30 |
| | Composition (mass %) Ni | Bal. | Bal. | Bal. | Bal. | Bal. | Bal. | Bal. |
| | Si | — | — | — | — | — | — | — |
| | Cr | 15.0 | 15.0 | 15.0 | 15.0 | 15.0 | 15.0 | 15.0 |
| | Fe | — | — | — | — | — | — | — |
| | B | 4.0 | 4.0 | 4.0 | 4.0 | 4.0 | 4.0 | 4.0 |
| | C | — | — | — | — | — | — | — |

TABLE 2

| Classification | Comp. Ex. 1 | Comp. Ex. 2 | Example 1 | Example 2 | Example 3 | Example 4 | Comp. Ex. 3 |
|---|---|---|---|---|---|---|---|
| Position with respect to Bonding Surface | | | | | | | |
| Outer Edge | | | | | | | |
| Distance (mm) | 0.0 | 0.0 | 0.3 | 3.0 | 6.0 | 5.0 | 7.5 |
| Ratio (%) | 0 | 0 | 10 | 100 | 200 | 167 | 250 |
| Inner Edge | | | | | | | |
| Distance (mm) | — | — | — | — | — | — | — |
| Ratio (%) | — | — | — | — | — | — | — |
| Area Ratio (%) | 100 | 100 | 98 | 77 | 58 | 51 | 49 |
| Bonding Condition | | | | | | | |
| Bonding Surface Roughness (Rmax, μm) | 30 | 30 | 30 | 30 | 30 | 30 | 30 |
| Heating | | | | | | | |
| Method | Induction Heat | Induction Heat | Induction Heat | Induction Heat | Induction Heat | Induction Heat | Induction Heat |
| Frequency (kHz) | 3 | 3 | 3 | 3 | 3 | 3 | 3 |
| Bonding Temperature (°C) | 1250 | 1250 | 1250 | 1250 | 1250 | 1250 | 1250 |
| Holding Time (s) | 60 | 60 | 60 | 60 | 60 | 60 | 60 |
| Pressure (MPa) | 4 | 4 | 4 | 4 | 4 | 4 | 4 |
| Bonding Atmosphere | Ar | Ar | Ar | Ar | Ar | Ar | Ar |

TABLE 3

| | Classification | Comp. Ex. 1 | Comp. Ex. 2 | Example 1 | Example 2 |
|---|---|---|---|---|---|
| Tensile Test | Tensile Strength (MPa) | 640 | 644 | 642 | 641 |

TABLE 3-continued

| | | Base Material | Base Material | Base Material | Base Material |
|---|---|---|---|---|---|
| Fatigue Test | Rupture Position Fatigue Limit (MPa) | 160 | 230 | 230 | 230 |
| | Rupture Position | Bonding Interface | No Rupture | No Rupture | No Rupture |
| Evaluation Remarks | | C | B Bonding portion was treated to be smoothened | A | A |

| Classification | | Example 3 | Example 4 | Comp. Ex. 3 |
|---|---|---|---|---|
| Tensile Test | Tensile Strength (MPa) | 641 | 642 | 587 |
| | Rupture Position | Base Material | Base Material | Base Material |
| Fatigue Test | Fatigue Limit (MPa) | 230 | 230 | 150 |
| | Rupture Position | No Rupture | No Rupture | Bonding Interface |
| Evaluation Remarks | | A | A Ring-like insertion material was used. | C |

Example 5 and Comparative Example 4

Stainless steel round rods (SUS304: 125 mm outer diameter) shown in Table 4 were bonded to each other with use of an insertion material shown in Table 4 under a condition shown in Table 5. Then, the bonded stainless steel round rods were subjected to a tensile test and a fatigue test. Results of the test are as shown in Table 6.

It is apparent from results shown in Table 6 that it is necessary to make the distance about the outer edge be at least ten times as large as the thickness of the insertion material.

Incidentally, in Table 5, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2 \times 10^6$ and the rate of repetition was 3 Hz.

TABLE 4

| | Classification | | Example 5 | Comp. Ex. 4 |
|---|---|---|---|---|
| Material to be bonded | Quality Shape | | SUS304 Round Rod | SUS304 Round Rod |
| | Outer Diameter (mm) | | φ125 | φ125 |
| | Inner Diameter (mm) | | — | — |
| Insertion Material | Shape | Outer Diameter (mm) | φ124.4 | φ125 |
| | | Inner Diameter (mm) | — | φ12.5 |
| | | Thickness (μm) | 30 | 30 |
| | Composition (mass %) | Ni | Bal. | Bal. |
| | | Si | — | — |
| | | Cr | 15.0 | 15.0 |
| | | Fe | — | — |

TABLE 4-continued

| Classification | Example 5 | Comp. Ex. 4 |
|---|---|---|
| B | 4.0 | 4.0 |
| C | — | — |

TABLE 5

| Classification | | | Example 5 | Comp. Ex. 4 |
|---|---|---|---|---|
| Position with respect to Bonding Surface | Outer Edge | Distance (mm) | 0.3 | 0.0 |
| | | Ratio (%) | 10 | 0 |
| | Inner Edge | Distance (mm) | — | — |
| | | Ratio (%) | — | — |
| | Area Ratio (%) | | 99 | 99 |
| Bonding Condition | Bonding Surface Roughness (Rmax, μm) | | 30 | 30 |
| | Heating | Method | Induction Heat | Induction Heat |
| | | Frequency (kHz) | 3 | 3 |
| | Bonding Temperature (° C.) | | 1250 | 1250 |
| | Holding Time (s) | | 180 | 180 |
| | Pressure (MPa) | | 4 | 4 |
| | Bonding Atmosphere | | Ar | Ar |

TABLE 6

| Classification | | Example 5 | Comp. Ex. 4 |
|---|---|---|---|
| Tensile Test | Tensile Strength (MPa) | 643 | 642 |
| | Rupture Position | Base Material | Base Material |
| Fatigue Test | Fatigue Limit (MPa) | 230 | 200 |
| | Rupture Position | No Rupture | Bonding Interface |
| Evaluation Remarks | | A | B Rupture in bonding interface with a large fatigue limit. |

Example 6 and 7 and Comparative Examples 5 and 6

Stainless steel round rods (SUS304: 125 mm outer diameter) shown in Table 7 were bonded to each other with use of an insertion material shown in the same Table 7 under a condition shown in Table 8. Then, the bonded stainless steel round rods were subjected to a tensile test and a fatigue test. Results of the test are as shown in Table 9.

It is apparent from results shown in Table 9 that it is desirable to select the boron content in the insertion material to be in a range of from 2 mass % to 5 mass %.

Incidentally, in Table 8, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2 \times 10^6$ and the rate of repetition was 3 Hz.

TABLE 7

| Classification | Comp. Ex. 5 | Example 6 | Example 7 | Comp. Ex. 6 |
|---|---|---|---|---|
| Material to be bonded | | | | |
| Quality | SUS304 | SUS304 | SUS304 | SUS304 |
| Shape | Round Rod | Round Rod | Round Rod | Round Rod |
| Outer Diameter (mm) | φ125 | φ125 | φ125 | φ125 |
| Inner Diameter (mm) | — | — | — | — |
| Insertion Material Shape | | | | |
| Outer Diameter (mm) | φ122 | φ122 | φ122 | φ122 |
| Inner Diameter (mm) | — | — | — | — |
| Thickness (μm) | 30 | 30 | 30 | 30 |
| Composition (mass %) | | | | |
| Ni | Bal. | Bal. | Bal. | Bal. |
| Si | — | — | — | — |
| Cr | 15.0 | 15.0 | 15.0 | 15.0 |
| Fe | — | — | — | — |
| B | 1.0 | 2.0 | 5.0 | 6.0 |
| C | — | — | — | — |

TABLE 8

| Classification | Comp. Ex. 5 | Example 6 | Example 7 | Comp. Ex. 6 |
|---|---|---|---|---|
| Position with respect to Bonding Surface | | | | |
| Outer Edge | | | | |
| Distance (mm) | 1.5 | 1.5 | 1.5 | 1.5 |
| Ratio (%) | 50 | 50 | 50 | 50 |
| Inner Edge | | | | |
| Distance (mm) | — | — | — | — |
| Ratio (%) | — | — | — | — |
| Area Ratio (%) | 95 | 95 | 95 | 95 |
| Bonding Condition | | | | |
| Bonding Surface Roughness (Rmax, μm) | 30 | 30 | 30 | 30 |
| Heating | | | | |
| Method | Induction Heat | Induction Heat | Induction Heat | Induction Heat |
| Frequency (kHz) | 3 | 3 | 3 | 3 |
| Bonding Temperature (° C.) | 1250 | 1250 | 1250 | 1250 |
| Holding Time (s) | 180 | 180 | 180 | 180 |
| Pressure (MPa) | 4 | 4 | 4 | 4 |
| Bonding Atmosphere | Ar | Ar | Ar | Ar |

TABLE 9

| Classification | Comp. Ex. 5 | Example 6 | Example 7 | Comp. Ex. 6 |
|---|---|---|---|---|
| Tensile Test | | | | |
| Tensile Strength (MPa) | 549 | 641 | 644 | 588 |
| Rupture Position | Bonding Interface | Base Material | Base Material | Bonding Interface |
| Fatigue Test | | | | |
| Fatigue Limit (MPa) | 130 | 230 | 230 | 200 |
| Rupture Position | Bonding Interface | No Rupture | No Rupture | Bonding Interface |
| Evaluation Remarks | C | A | A | C |

Example 8 and 9 and Comparative Examples 7 and 8

Stainless steel round rods (SUS304: 125 mm outer diameter) shown in Table 10 were bonded to each other with use of an insertion material shown in the same Table 10 under a condition shown in Table 11. Then, the bonded stainless steel round rods were subjected to a tensile test and a fatigue test. Results of the test are as shown in Table 12.

It is apparent from results shown in Table 12 that it is desirable to select the thickness of the insertion material to be in a range of from 20 μm to 100 μm.

Incidentally, in Table 11, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2 \times 10^6$ and the rate of repetition was 3 Hz.

TABLE 10

| Classification | Comp. Ex. 7 | Example 8 | Example 9 | Comp. Ex. 8 |
|---|---|---|---|---|
| Material to be bonded | | | | |
| Quality | SUS304 | SUS304 | SUS304 | SUS304 |
| Shape | Round Rod | Round Rod | Round Rod | Round Rod |
| Outer Diameter (mm) | φ125 | φ125 | φ125 | φ125 |
| Inner Diameter (mm) | — | — | — | — |
| Insertion Material Shape | | | | |
| Outer Diameter (mm) | φ122 | φ122 | φ122 | φ122 |
| Inner Diameter (mm) | — | — | — | — |
| Thickness (μm) | 10 | 20 | 100 | 120 |
| Composition (mass %) | | | | |
| Ni | Bal. | Bal. | Bal. | Bal. |
| Si | — | — | — | — |
| Cr | 15.0 | 15.0 | 15.0 | 15.0 |
| Fe | — | — | — | — |
| B | 4.0 | 4.0 | 4.0 | 4.0 |
| C | — | — | — | — |

TABLE 11

| Classification | Comp. Ex. 7 | Example 8 | Example 9 | Comp. Ex. 8 |
|---|---|---|---|---|
| Position with respect to Bonding Surface Outer Edge | | | | |
| Distance (mm) | 1.5 | 1.5 | 1.5 | 1.5 |
| Ratio (%) | 50 | 50 | 50 | 50 |
| Inner Edge | | | | |
| Distance (mm) | — | — | — | — |
| Ratio (%) | — | — | — | — |
| Area Ratio (%) | 95 | 95 | 95 | 95 |
| Bonding Condition | | | | |
| Bonding Surface Roughness (Rmax, μm) | 30 | 30 | 30 | 30 |
| Heating | | | | |
| Method | Induction Heat | Induction Heat | Induction Heat | Induction Heat |
| Frequency (kHz) | 3 | 3 | 3 | 3 |
| Bonding Temperature (° C.) | 1250 | 1250 | 1250 | 1250 |
| Holding Time (s) | 180 | 180 | 180 | 180 |
| Pressure (MPa) | 4 | 4 | 4 | 4 |
| Bonding Atmosphere | Ar | Ar | Ar | Ar |

TABLE 12

| | Classification | Comp. Ex. 7 | Example 8 | Example 9 | Comp. Ex. 8 |
|---|---|---|---|---|---|
| Tensile Test | Tensile Strength (MPa) | 555 | 642 | 641 | 608 |
| | Rupture Position | Bonding Interface | Base Material | Base Material | Bonding Interface |
| Fatigue Test | Fatigue Limit (MPa) | 140 | 230 | 230 | 210 |
| | Rupture Position | Bonding Interface | No Rupture | No Rupture | Bonding Interface |
| Evaluation Remarks | | C | A | A | C |

Example 10 and 11 and Comparative Examples 9 and 10

Stainless steel pipes (SUS304: 165 mm outer diameter× 145 inner diameter) shown in Table 13 were bonded with use of an insert material shown in the same Table 13 under the condition shown in Table 14. Then, a tensile test and a fatigue test were conducted on the bonded stainless steel pipes. The results are shown in Table 15.

It is apparent from the results shown in Table 15 that it is desirable to select the ratio of the area of the insertion material to the area of each bonding surface to be in a range of from 50% to 99%, preferably in a range of from 51% to 98%.

Incidentally, in Table 14, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2 \times 10^6$ and the rate of repetition was 3 Hz.

TABLE 13

| Classification | Comp. Ex. 9 | Example 10 | Example 11 | Comp. Ex. 10 |
|---|---|---|---|---|
| Material to be bonded | | | | |
| Quality | SUS304 | SUS304 | SUS304 | SUS304 |
| Shape | Pipe | Pipe | Pipe | Pipe |
| Outer Diameter (mm) | φ165 | φ165 | φ165 | φ165 |
| Inner Diameter (mm) | φ145 | φ145 | φ145 | φ145 |
| Insertion Material Shape | | | | |
| Outer Diameter (mm) | φ165 | φ164.2 | φ164.2 | φ155 |
| Inner Diameter (mm) | φ145 | φ145 | φ154.4 | φ145 |
| Thickness (μm) | 40 | 40 | 40 | 40 |
| Composition (mass %) | | | | |
| Ni | Bal. | Bal. | Bal. | Bal. |
| Si | 4.0 | 4.0 | 4.0 | 4.0 |
| Cr | 8.0 | 8.0 | 8.0 | 8.0 |
| Fe | 3.0 | 3.0 | 3.0 | 3.0 |
| B | 4.0 | 4.0 | 4.0 | 4.0 |
| C | — | — | — | — |

TABLE 14

| Classification | Comp. Ex. 9 | Example 10 | Example 11 | Comp. Ex. 10 |
|---|---|---|---|---|
| Position with respect to Bonding Surface Outer Edge | | | | |
| Distance (mm) | 0.0 | 0.4 | 0.4 | 5.0 |
| Ratio (%) | 0 | 10 | 10 | 125 |
| Inner Edge | | | | |
| Distance (mm) | 0.0 | 0.0 | 0.7 | 0.0 |
| Ratio (%) | 0 | 0 | 18 | 0 |
| Area Ratio (%) | 100 | 96 | 50 | 48 |
| Bonding Condition | | | | |
| Bonding Surface Roughness (Rmax, μm) | 30 | 30 | 30 | 30 |
| Heating | | | | |
| Method | Induction Heat | Induction Heat | Induction Heat | Induction Heat |
| Frequency (kHz) | 3 | 3 | 3 | 3 |
| Bonding Temperature (° C.) | 1250 | 1250 | 1250 | 1250 |
| Holding Time (s) | 120 | 120 | 120 | 120 |
| Pressure (MPa) | 4 | 4 | 4 | 4 |
| Bonding Atmosphere | Ar | Ar | Ar | Ar |

TABLE 15

| Classification | | Comp. Ex. 9 | Example 10 | Example 11 | Comp. Ex. 10 |
|---|---|---|---|---|---|
| Tensile Test | Tensile Strength (MPa) | 648 | 643 | 640 | 639 |
| | Rupture Position | Base Material | Base Material | Base Material | Base Material |
| Fatigue Test | Fatigue Limit (MPa) | 210 | 230 | 230 | 220 |
| | Rupture Position | Bonding Interface | No Rupture | No Rupture | Bonding Interface |
| Evaluation | | B | A | A | B |
| Remarks | | | | | Rupture in bonding interface with a large fatigue limit. |

Example 12 and 13 and Comparative Examples 11 and 12

Stainless steel pipes (SUS304: 165 mm outer diameter× 145 inner diameter) shown in Table 16 were bonded with use of an insert material shown in the same Table 16 under the condition shown in Table 17. Then, a tensile test and a fatigue test were conducted on the bonded stainless steel pipes. The results are shown in Table 18.

It is apparent from results shown in Table 18 that it is desirable to select the thickness of the insertion material to be in a range of from 20 μm to 100 μm.

Incidentally, in Table 17, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was 2×10⁶ and the rate of repetition was 3 Hz.

TABLE 16

| Classification | Example 12 | Example 13 | Comp. Ex. 11 | Comp. Ex. 12 |
|---|---|---|---|---|
| Material to be bonded | | | | |
| Quality | SUS304 | SUS304 | SUS304 | SUS304 |
| Shape | Pipe | Pipe | Pipe | Pipe |
| Outer Diamter (mm) | φ165 | φ165 | φ165 | φ165 |
| Inner Diameter (mm) | φ145 | φ145 | φ145 | φ145 |
| Insertion Material Shape | | | | |
| Outer Diameter (mm) | φ160 | φ160 | φ160 | φ164.2 |
| Inner Diameter (mm) | φ146 | φ146 | φ146 | φ154.4 |
| Thickness (μm) | | | | |
| Composition (mass %) | | | | |
| Ni | Bal. | Bal. | Bal. | Bal. |
| Si | 4.0 | 4.0 | 4.0 | 4.0 |
| Cr | 8.0 | 8.0 | 8.0 | 8.0 |
| Fe | 3.0 | 3.0 | 3.0 | 3.0 |
| B | 2.0 | 5.0 | 4.0 | 4.0 |
| C | — | — | — | — |

TABLE 17

| Classification | Example 12 | Example 13 | Comp. Ex. 11 | Comp. Ex. 12 |
|---|---|---|---|---|
| Position with respect to Bonding Surface | | | | |
| Outer Edge | | | | |
| Distance (mm) | 2.5 | 2.5 | 2.5 | 2.5 |
| Ratio (%) | 63 | 63 | 63 | 63 |
| Inner Edge | | | | |
| Distance (mm) | 0.5 | 0.5 | 0.5 | 0.5 |
| Ratio (%) | 13 | 13 | 13 | 13 |
| Area Ratio (%) | 69 | 69 | 69 | 69 |
| Bonding Condition | | | | |
| Bonding Surface Roughness (Rmax, μm) | 30 | 30 | 30 | 30 |
| Heating | | | | |
| Method | Induction Heat | Induction Heat | Induction Heat | Induction Heat |
| Frequency (kHz) | 3 | 3 | 3 | 3 |
| Bonding Temperature (° C.) | 1250 | 1250 | 1250 | 1250 |
| Holding Time (s) | 120 | 120 | 120 | 120 |
| Pressure (MPa) | 4 | 4 | 4 | 4 |
| Bonding Atmosphere | Ar | Ar | Ar | Ar |

TABLE 18

| Classification | | Example 12 | Example 13 | Comp. Ex. 11 | Comp. Ex. 12 |
|---|---|---|---|---|---|
| Tensile Test | Tensile Strength (MPa) | 634 | 646 | 567 | 597 |
| | Rupture Position | Base Material | Base Material | Bonding Interface | Bonding Interface |
| Fatigue Test | Fatigue Limit (MPa) | 230 | 230 | 160 | 180 |
| | Rupture Position | No Rupture | No Rupture | Bonding Interface | Bonding Interface |
| Evaluation Remarks | | A | A | C | C |

Example 14 and Comparative Example 13

Carbon steel rectangular pipes (SS400: 100 mm square× 80 mm square) shown in Table 19 were bonded to each other with use of an insertion material shown in the same Table 19 under a condition shown in Table 20. Then, the bonded carbon steel rectangular pipes were subjected to a tensile test and a fatigue test. Results of the test are as shown in Table 21.

It is apparent from results shown in Table 21 that it is necessary to select the surface roughness $R_{max}$ of each bonding surface to be not larger than 50 μm.

Incidentally, in Table 20, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2\times10^6$ and the rate of repetition was 3 Hz.

TABLE 19

| Classification | | | Comp. Ex. 13 | Example 14 |
|---|---|---|---|---|
| Material to be bonded | Quality | | SS400 | SS400 |
| | Shape | | Rectangular Pipe | Rectangular Pipe |
| | Outer Size (mm) | | □100 | □100 |
| | Inner Size (mm) | | □80 | □80 |
| Insertion Material | Shape | Outer Size (mm) | □98.8 | □98.8 |
| | | Inner Size (mm) | □80 | □80 |
| | | Thickness ($\mu$m) | 30 | 30 |
| | Composition (mass %) | Ni | — | — |
| | | Si | 3.0 | 3.0 |
| | | Cr | — | — |
| | | Fe | Bal. | Bal. |
| | | B | 3.0 | 3.0 |
| | | C | 1.5 | 1.5 |

TABLE 20

| Classification | | | Comp. Ex. 13 | Example 14 |
|---|---|---|---|---|
| Position with respect to Bonding Surface | Outer Edge | Distance (mm) | 0.6 | 0.6 |
| | | Ratio (%) | 20 | 20 |
| | Inner Edge | Distance (mm) | 0.0 | 0.0 |
| | | Ratio (%) | 0 | 0 |
| | Area Ratio (%) | | 66 | 66 |
| Bonding Condition | Bonding Surface Roughness (Rmax, $\mu$m) | | 60 | 50 |
| | Heating Method | | Induction Heat | Induction Heat |
| | Frequency (kHz) | | 3 | 3 |
| | Bonding Temperature (° C.) | | 1250 | 1250 |
| | Holding Time (s) | | 60 | 60 |
| | Pressure (MPa) | | 4 | 4 |
| | Bonding Atmosphere | | Ar | Ar |

TABLE 21

| Classification | | Comp. Ex. 13 | Example 14 |
|---|---|---|---|
| Tensile Test | Tensile Strength (MPa) | 430 | 450 |
| | Rupture Position | Bonding Interface | Base Material |
| Fatigue Test | Fatigue Limit (MPa) | 210 | 270 |
| | Rupture Position | Bonding Interface | No Rupture |
| Evaluation Remarks | | C | A |

Example 15 and 16 and Comparative Examples 14 and 15

Carbon steel rectangular pipes (SS400: 100 mm square× 80 mm square) shown in Table 22 were bonded to each other with use of an insertion material shown in the same Table 22 under a condition shown in Table 23. Then, the bonded carbon steel rectangular pipes were subjected to a tensile test and a fatigue test. Results of the test are as shown in Table 24.

It is apparent from results shown in Table 24 that it is desirable to select the pressure to be applied to be in a range of from 3 MPa to 9 MPa.

Incidentally, in Table 23, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2\times10^6$ and the rate of repetition was 3 Hz.

TABLE 22

| Classification | Comp. Ex. 14 | Example 15 | Example 16 | Comp. Ex. 15 |
|---|---|---|---|---|
| Material to be bonded | | | | |
| Quality | SS400 | SS400 | SS400 | SS400 |
| Shape | Rectangular Pipe | Rectangular Pipe | Rectangular Pipe | Rectangular Pipe |
| Outer Size (mm) | □100 | □100 | □100 | □100 |
| Inner Size (mm) | □80 | □80 | □80 | □80 |
| Insertion Material Shape | | | | |
| Outer Size (mm) | □98.8 | □98.8 | □98.8 | □98.8 |
| Inner Size (mm) | □80 | □80 | □80 | □80 |
| Thickness ($\mu$m) | 30 | 30 | 30 | 30 |
| Composition (mass %) | | | | |
| Ni | — | — | — | — |
| Si | 3.0 | 3.0 | 3.0 | 3.0 |
| Cr | — | — | — | — |
| Fe | Bal. | Bal. | Bal. | Bal. |
| B | 3.0 | 3.0 | 3.0 | 3.0 |
| C | 1.5 | 1.5 | 1.5 | 1.5 |

TABLE 23

| Classification | Comp. Ex. 14 | Example 15 | Example 16 | Comp. Ex. 15 |
|---|---|---|---|---|
| Position with respect to Bonding Surface Outer Edge | | | | |
| Distance (mm) | 0.6 | 0.6 | 0.6 | 0.6 |
| Ratio (%) | 20 | 20 | 20 | 20 |
| Inner Edge | | | | |
| Distance (mm) | 0.0 | 0.0 | 0.0 | 0.0 |
| Ratio (%) | 0 | 0 | 0 | 0 |
| Area Ratio (%) | 66 | 66 | 66 | 66 |
| Bonding Condition | | | | |
| Bonding Surface Roughness (Rmax, $\mu$m) | 30 | 30 | 30 | 30 |

TABLE 23-continued

| Classification | Comp. Ex. 14 | Example 15 | Example 16 | Comp. Ex. 15 |
|---|---|---|---|---|
| Heating | | | | |
| Method | Induction Heat | Induction Heat | Induction Heat | Induction Heat |
| Frequency (kHz) | 3 | 3 | 3 | 3 |
| Bonding Temperature (° C.) | 1250 | 1250 | 1250 | 1250 |
| Holding Time (s) | 60 | 60 | 60 | 60 |
| Pressure (MPa) | 2 | 3 | 9 | 10 |
| Bonding Atmosphere | $N_2$ | $N_2$ | $N_2$ | $N_2$ |

TABLE 24

| Classification | Comp. Ex. 14 | Example 15 | Example 16 | Comp. Ex. 15 |
|---|---|---|---|---|
| Tensile Test | | | | |
| Tensile Strength (MPa) | 388 | 447 | 445 | 420 |
| Rupture Position | Bonding Interface | Base Material | Base Material | Base Material |
| Fatigue Test | | | | |
| Fatigue Limit (MPa) | 170 | 270 | 270 | 200 |
| Rupture Position | Bonding Interface | No Rupture | No Rupture | Bonding Interface |
| Evaluation | x | ○ | ○ | Δ |
| Remarks | | | | Excessive Deformation in Bonding Portion. |

Examples 17 to 19 and Comparative Examples 16 to 18

Carbon steel rectangular pipes (SS400: 100 mm square × 80 mm square) shown in Table 25 were bonded to each other with use of an insertion material shown in the same Table 25 under a condition shown in Table 26. Then, the bonded carbon steel rectangular pipes were subjected to a tensile test and a fatigue test. Results of the test are as shown in Table 27.

It is apparent from results shown in Table 27 that it is preferable to carry out bonding in a vacuum or in a nitrogen gas atmosphere under the condition in which the frequency of a current is in a range of from 3 kHz to 100 kHz.

Incidentally, in Table 26, the "distance" and "ratio" about the "outer edge" mean the shortest distance from the outer edge of the insertion material to the outer edge of each bonding surface, and the ratio of the distance to the thickness of the insertion material, respectively. The "distance" and "ratio" about the "inner edge" mean the largest distance from the inner edge of the insertion material to the inner edge of each bonding surface, and the ratio of the distance to the thickness of the insertion material, respectively.

Further, the fatigue test was carried out by tensile compression under the condition in which the number (Nf) of repetitions was $2 \times 10^6$ and the rate of repetition was 3 Hz.

TABLE 25

| Classification | Example 17 | Comp. Ex. 16 | Example 18 | Comp. Ex. 17 | Example 19 | Comp. Ex. 18 |
|---|---|---|---|---|---|---|
| Material to be bonded | | | | | | |
| Quality | SS400 | SS400 | SS400 | SS400 | SS400 | SS400 |
| Shape | Rectangular Pipe | Rectangular Pipe | Rectangular Pipe | Rectangular Pipe | Rectangular Pipe | Rectangular Pipe |
| Outer Size (mm) | □100 | □100 | □100 | □100 | □100 | □100 |
| Inner Size (mm) | □80 | □80 | □80 | □80 | □80 | □80 |
| Insertion Material Shape | | | | | | |
| Outer Size (mm) | □98.8 | □98.8 | □98.8 | □98.8 | □98.8 | □98.8 |
| Inner Size (mm) | □80 | □80 | □80 | □80 | □80 | □80 |
| Thickness (μm) | 30 | 30 | 30 | 30 | 30 | 30 |
| Composition (mass %) | | | | | | |
| Ni | — | — | — | — | — | — |
| Si | 3.0 | 3.0 | 3.0 | 3.0 | 3.0 | 3.0 |
| Cr | — | — | — | — | — | — |
| Fe | Bal. | Bal. | Bal. | Bal. | Bal. | Bal. |
| B | 3.0 | 3.0 | 3.0 | 3.0 | 3.0 | 3.0 |
| C | 1.5 | 1.5 | 1.5 | 1.5 | 1.5 | 1.5 |

TABLE 26

| Classification | Example 17 | Comp. Ex. 16 | Example 18 | Comp. Ex. 17 | Example 19 | Comp. Ex. 18 |
|---|---|---|---|---|---|---|
| Position with respect to Bonding Surface Outer Edge | | | | | | |
| Distance (mm) | 0.6 | 0.6 | 0.6 | 0.6 | 0.6 | 0.6 |
| Ratio (%) | 20 | 20 | 20 | 20 | 20 | 20 |
| Inner Edge | | | | | | |
| Distance (mm) | 0.0 | 0.0 | 0.0 | 0.0 | 0.0 | 0.0 |
| Ratio (%) | 0 | 0 | 0 | 0 | 0 | 0 |
| Area Ratio (%) | 66 | 66 | 66 | 66 | 66 | 66 |
| Bonding Condition | | | | | | |
| Bonding Surface Roughness (Rmax, μm) | 30 | 30 | 30 | 30 | 30 | 30 |
| Heating | | | | | | |
| Method | Induction Heat | Induction Heat | Induction Heat | Induction Heat | Induction Heat | Induction Heat |
| Frequency (kHz) | 3 | 3 | 100 | 200 | 100 | 200 |
| Bonding Temperature (° C.) | 1250 | 1250 | 1250 | 1250 | 1250 | 1250 |
| Holding Time (s) | 60 | 60 | 60 | 60 | 60 | 60 |
| Pressure (MPa) | 4 | 4 | 4 | 4 | 4 | 4 |

TABLE 26-continued

| Classification | Example 17 | Comp. Ex. 16 | Example 18 | Comp. Ex. 17 | Example 19 | Comp. Ex. 18 |
|---|---|---|---|---|---|---|
| Bonding Atmosphere | Vacuum | Air | $N_2$ | $N_2$ | Vacuum | Vacuum |

TABLE 27

| Classification | Example 17 | Comp. Ex. 16 | Example 18 | Comp. Ex. 17 | Example 19 | Comp. Ex. 18 |
|---|---|---|---|---|---|---|
| Tensile Test | | | | | | |
| Tensile Strength (MPa) | 444 | 321 | 449 | 399 | 443 | 401 |
| Rupture Position | Base Material | Bonding Interface | Base Material | Bonding Interface | Base Material | Bonding Interface |
| Fatigue Test | | | | | | |
| Fatigue Limit (MPa) | 270 | 110 | 270 | 180 | 270 | 190 |
| Rupture Position | No Rupture | Bonding Interface | No Rupture | Bonding Interface | No Rupture | Bonding Interface |
| Evaluation Remarks | A | C | A | C | A | C |

As described above in detail, according to the present invention, the insertion material is prevented from being partly excessively extruded to bonding end portions and solidified thereat, at the time of bonding. Accordingly, there arises an excellent effect that both the workability and productivity in metal material bonding can be improved. Further, because the insertion material is prevented from being partly excessively extruded to bonding end portions and solidified thereat, at the time of bonding, there arises an excellent effect that the fatigue strength against the metal materials bonded to each other is never lowered.

What is claimed is:

1. A metal material bonding method comprising the steps of:
    interposing an insertion material, which has a lower melting point than that of metal materials to be bonded, between bonding end surfaces of the metal materials to be bonded; and
    heating and holding the metal materials to be bonded to a temperature not lower than a melting point of the insertion material and not higher than a melting point of the metal materials to be bonded while applying pressure to bonding surfaces of the metal materials to be bonded;
    wherein the insertion material has a size which is smaller than each of the bonding surfaces of the metal materials to be bonded such that there is a distance between an outer edge of the insertion material and an outer edge of the metal materials to be bonded.

2. A metal material bonding method according to claim 1, wherein each of the metal materials to be bonded is a solid material;
    the insertion material is formed of an Ni-group or Fe-group alloy containing boron in a range of from 2.0 mass % to 5.0 mass % and has a thickness in a range of from 20 $\mu$m to 100 $\mu$m;
    a ratio of the area of the insertion material to the area of each of the bonding surfaces of the metal materials to be bonded is in a range of from 50% to 99%; and
    the distance between the outer edge of the insertion material and the outer edge of each of the metal materials to be bonded is not smaller than a value ten times as large as the thickness of the insertion material.

3. A metal material bonding method according to claim 1, wherein each of the metal materials to be bonded is a hollow material;
    the insertion material is formed of an Ni-group or Fe-group alloy containing boron in a range of from 2.0 mass % to 5.0 mass % and has a thickness in a range of from 20 $\mu$m to 100 $\mu$m;
    a ratio of the area of the insertion material to the area of each of the bonding surfaces of the metal materials to be bonded is in a range of from 50% to 99%;
    the distance between the outer edge of the insertion material and the outer edge of each of the metal materials to be bonded is not smaller than a value ten times as large as the thickness of the insertion material; and
    a distance between an inner edge of the insertion material and an inner edge of each of the metal materials to be bonded is not larger than a value one hundred times as large as the thickness of the insertion material.

4. A metal material bonding method according to claim 1, wherein the surface roughness $R_{max}$ of each of the bonding surfaces of the metal materials to be bonded is not larger than 50 $\mu$m;
    the pressure applied to the bonding surfaces of the metal materials to be bonded is in a range of from 3 MPa to 9 Mpa; and
    the heating and holding is performed in a non-oxidative atmosphere.

5. A metal material bonding method according to claim 4, wherein the heating and holding is performed in an atmosphere of inert gas.

6. A metal material bonding method according to claim 5, wherein the inert gas is selected from an Ar gas, an $N_2$ gas and a mixture gas of Ar and $N_2$.

7. A metal material bonding method according to claim 4, wherein the heating and holding is performed in a substantial vacuum.

8. A metal material bonding method according to claim 7, wherein the substantial vacuum has a pressure not higher than $5 \times 10^{-2}$ mmHg.

9. A metal material bonding method according to claim 1, wherein the heating is performed by induction heating or high frequency resistance heating.

10. A metal material bonding method according to claim 9, wherein the frequency of a current in the induction heating or resistance heating is in a range of from 3 kHz to 100 kHz.

11. A metal material bonding method according to claim 2, wherein the insertion material is formed of an Ni-group or Fe-group alloy containing boron in a range of from 3.0 mass % to 4.0 mass %.

12. A metal material bonding method according to claim 3, wherein the insertion material is formed of an Ni-group or Fe-group alloy containing boron in a range of from 3.0 mass % to 4.0 mass %.

13. A metal material bonding method according to claim 10, wherein the frequency of the current in the induction heating or resistance heating is in a range of from 3 kHz to 30 kHz.

* * * * *